US008046720B2

(12) United States Patent
Wirth

(10) Patent No.: US 8,046,720 B2
(45) Date of Patent: Oct. 25, 2011

(54) GRAPHICAL SYSTEM AND METHOD FOR EDITING MULTI-LAYER DATA PACKETS

(75) Inventor: Jarryl Wirth, Box Hill (AU)

(73) Assignee: IXIA, Calabasas, CA (US)

(*) Notice: Subject to any disclaimer, the term of this patent is extended or adjusted under 35 U.S.C. 154(b) by 1622 days.

(21) Appl. No.: 10/316,445

(22) Filed: Dec. 10, 2002

(65) Prior Publication Data

US 2004/0109453 A1 Jun. 10, 2004

(51) Int. Cl.
*G06F 3/048* (2006.01)
(52) U.S. Cl. .................................. 715/853; 709/224
(58) Field of Classification Search ........... 715/853–855
See application file for complete search history.

(56) References Cited

U.S. PATENT DOCUMENTS

| | | | | |
|---|---|---|---|---|
| 5,822,520 | A * | 10/1998 | Parker | 709/230 |
| 6,353,446 | B1 * | 3/2002 | Vaughn et al. | 715/733 |
| 6,639,607 | B1 * | 10/2003 | Ferguson et al. | 715/734 |
| 6,671,869 | B2 * | 12/2003 | Davidson et al. | 716/17 |
| 6,707,474 | B1 * | 3/2004 | Beck et al. | 715/771 |
| 6,757,742 | B1 * | 6/2004 | Viswanath | 709/246 |
| 6,814,842 | B1 * | 11/2004 | Yago et al. | 704/270.1 |
| 6,862,699 | B2 * | 3/2005 | Nakashima et al. | 714/701 |
| 6,931,574 | B1 * | 8/2005 | Coupal et al. | 714/39 |
| 6,941,551 | B1 * | 9/2005 | Turkoglu | 717/174 |
| 7,047,297 | B2 * | 5/2006 | Huntington et al. | 709/224 |
| 7,278,061 | B2 | 10/2007 | Smith | |
| 2002/0186697 | A1 * | 12/2002 | Thakkar | 370/401 |
| 2002/0198985 | A1 * | 12/2002 | Fraenkel et al. | 709/224 |
| 2003/0014669 | A1 * | 1/2003 | Caceres et al. | 713/201 |
| 2003/0036896 | A1 * | 2/2003 | Skingsley et al. | 703/21 |
| 2003/0131098 | A1 * | 7/2003 | Huntington et al. | 709/224 |
| 2003/0145039 | A1 * | 7/2003 | Bonney et al. | 709/202 |
| 2003/0172177 | A1 * | 9/2003 | Kersley et al. | 709/236 |
| 2004/0068681 | A1 * | 4/2004 | Smith | 714/43 |

OTHER PUBLICATIONS

U.S. Appl. No. 10/266,507, filed Oct. 8, 2002, Smith.
Screenshot of Ixia PDU Builder Main Screen, p. 1 (May 28, 2002).

* cited by examiner

*Primary Examiner* — Ashraf Zahr
(74) *Attorney, Agent, or Firm* — Jenkins, Wilson, Taylor & Hunt, P.A.

(57) ABSTRACT

A graphical system and method for creating and editing packets of data is disclosed, which displays on a first pane of a computer window a hierarchical order of all of the protocol layers and protocol fields of a data packets, and displays on a second pane of the same window the entire encoded data packet in standard hexadecimal notation. In the first pane, a user can select a field of data pertaining to any of the protocol layers from the hierarchical order, and change any of the protocol field values, change options within a protocol, or add additional protocol layers to the packet, and the portion of the encoded data pertaining to the changed data will be updated in the second pane.

28 Claims, 15 Drawing Sheets

GRAPHICAL SYSTEM AND METHOD FOR EDITING MULTI-LAYER DATA PACKETS

TECHNICAL FIELD

This invention relates to communications networks and, more specifically, to systems and methods for constructing and editing multi-layer packets of data, as defined by communications protocols.

BACKGROUND

In certain applications of communications systems, for example, communications testing products, it is necessary to generate simulated network traffic. As part of this simulation, users will need to construct and modify data packets, often called Protocol Data Units (PDUs) which are then transmitted as the simulated traffic. The format and content of each PDU is based on previously-defined communications protocols. A protocol defines the format, length and meaning of the fields or data elements which a PDU contains. Some protocols define optional fields, which may or may not be included in a PDU. Also, in order to build a complete PDU, users will generally need to encapsulate several different protocols in layers, in both standard and non-standard sequences. Each protocol may be industry standard or proprietary to a particular network equipment vendor.

A software tool used to construct and edit PDUs is called a PDU Builder, and is typically accessed by a user through a Graphical User Interface (GUI). One such tool is used in a communications testing product called "Router Tester" and is available from Agilent Technologies, Inc. of Palo Alto, Calif., USA, which tool is hereby incorporated by reference herein.

The GUIs for current PDU Builders have a similar look and feel. Typically, the protocol fields in a PDU are displayed in a window using standard GUI controls, such as Edit Boxes, Check Boxes, etc. In most cases, each protocol is displayed in a separate window, and to edit a multi-layer PDU the user must switch back and forth between several windows. In some cases, more than one protocol is displayed in a single window, but only a small number—usually no more than two. And in these cases, not all the fields in the protocols can be displayed in the window, because of the limitations of screen space.

There are several disadvantages of this approach. One such disadvantage is that users must switch between several different windows to construct and edit a multi-layer PDU, because each protocol layer of the PDU is displayed in its associated window. Thus, it is not possible to see the entire PDU at once. A further problem with existing systems is that the number of protocol layers that can be supported is small, in the order of about 3-4 layers. The design of such systems has intrinsically limited scalability, because adding more protocol layers means adding more and more windows, thereby making the GUI increasingly more complex and less usable.

Further problems with existing systems are that protocol layering can only be done in one of a few fixed and well-known sequences, and that the size of protocols and PDUs that can be displayed is limited by the size of the windows. Also the choice of protocols is limited to a relatively small list of well-known standard protocols. In addition, optional fields are only supported in a very limited and indirect way.

BRIEF SUMMARY

The present invention is directed to a scrollable, dynamic system and method which enables a user to interactively construct and modify an entire multi-layer PDU in one place. This system and method allows the user to create arbitrarily large and complex PDUs, with protocols layered in any order and to any depth, all in a single view.

In one embodiment, a system and method of creating PDUs displays on a first pane of a GUI window a tree-structured hierarchical order of all the protocol layers, header fields and payload of a PDU, and displays on a second pane of the same window the entire encoded PDU data in standard hexadecimal notation. The tree display is dynamic, in that each node of the tree can be interactively opened or closed by the user to hide or reveal the data fields in the next level down of the hierarchy.

In a further embodiment, a user can select a field of data pertaining to any of the protocol layers from the hierarchical order and change any of the protocol field values, or change options within a protocol, and the portion of encoded PDU data pertaining to the changed data will be changed and displayed in the second pane of the window. In addition, any derived protocol fields are automatically re-calculated by the system and re-displayed in both parts of the window.

In a still further embodiment in response to a user adding or removing a selected protocol layer in a first pane of a window, the proper protocol fields are added or removed at the proper location within the existing PDU's hierarchical order of layers. The revised PDU encoding is then displayed in hexadecimal notation in a second pane of the existing window.

In a still further embodiment in response to a user adding or removing selected optional protocol fields to a first pane of a window and the PDU header is appropriately extended or reduced, at the proper location within the existing PDU. The revised PDU encoding is then displayed in hexadecimal notation in a second pane of the existing window.

In a still further embodiment, a user can over-ride automatic calculation of derived protocol fields in a first pane of a window and the derived field's value is not automatically recalculated when other parts of the PDU are changed, but rather the fixed value manually entered by the user is retained. The revised PDU encoding is then displayed in hexadecimal notation in a second pane of the existing window.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Before beginning a discussion of the inventive concepts and the embodiments thereof, it may be helpful to review existing tools for the construction of PDUs. This will be under taken with respect to FIGS. 12, 13 and 14, of the prior art.

Figure 12:
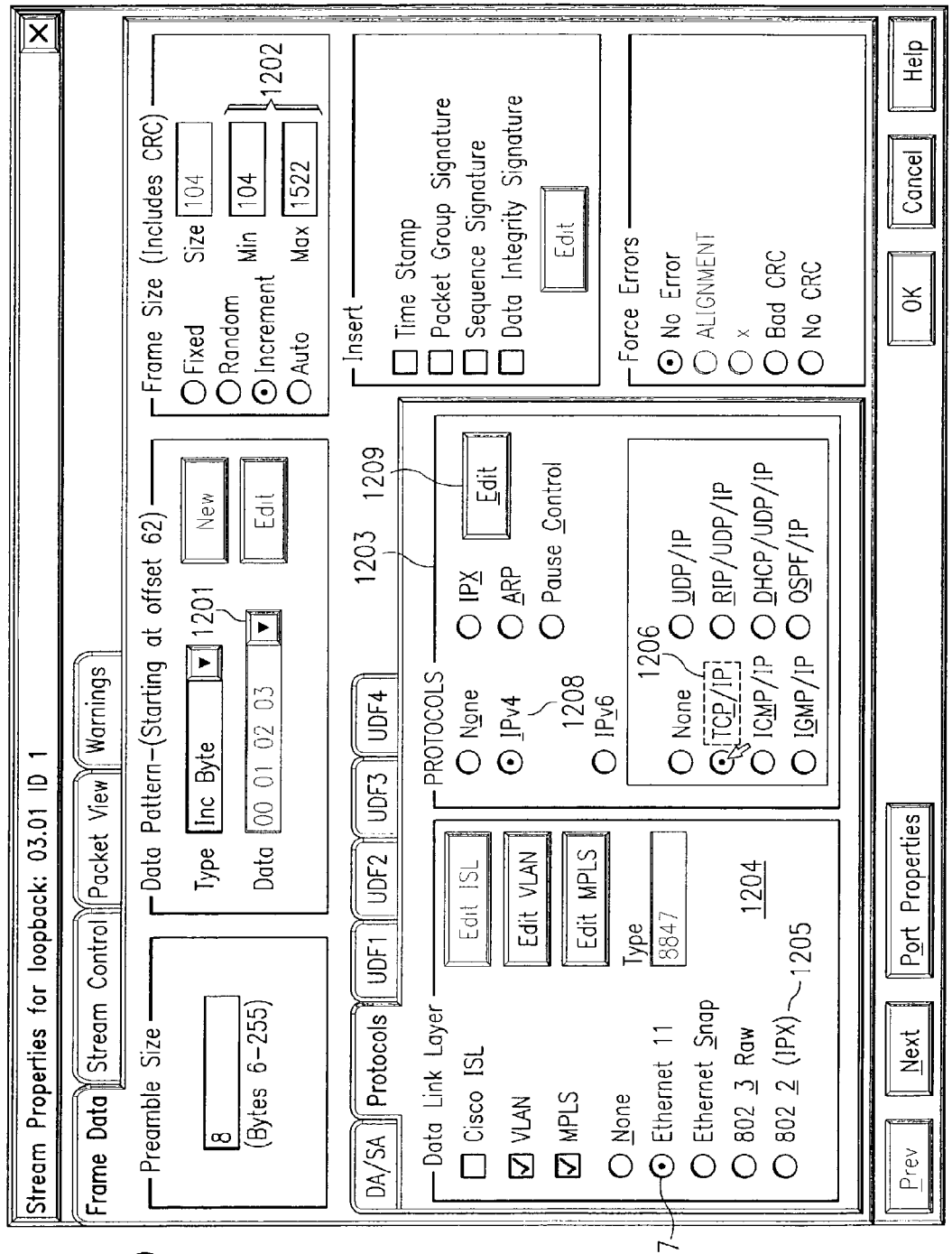
FIGS. 12, 13 and 14 are screen views of a prior art PDU builder.

Beginning with FIG. 12, window 1200 allows the user to define payload data 1201, its packet size 1202 and protocols 1203, 1204 in the PDU. The layering is limited to the fixed options, chosen from set 1203, 1204. The above example shows a 3-layer (TCP/IP/Ethernet pronounced "TCP over IP over Ethernet") PDU being selected 1206, 1207, 1208. TCP, IP and Ethernet are three well-known Internet protocols and the layering means that each protocol is encapsulated inside the payload of the next one.

Figure 13:
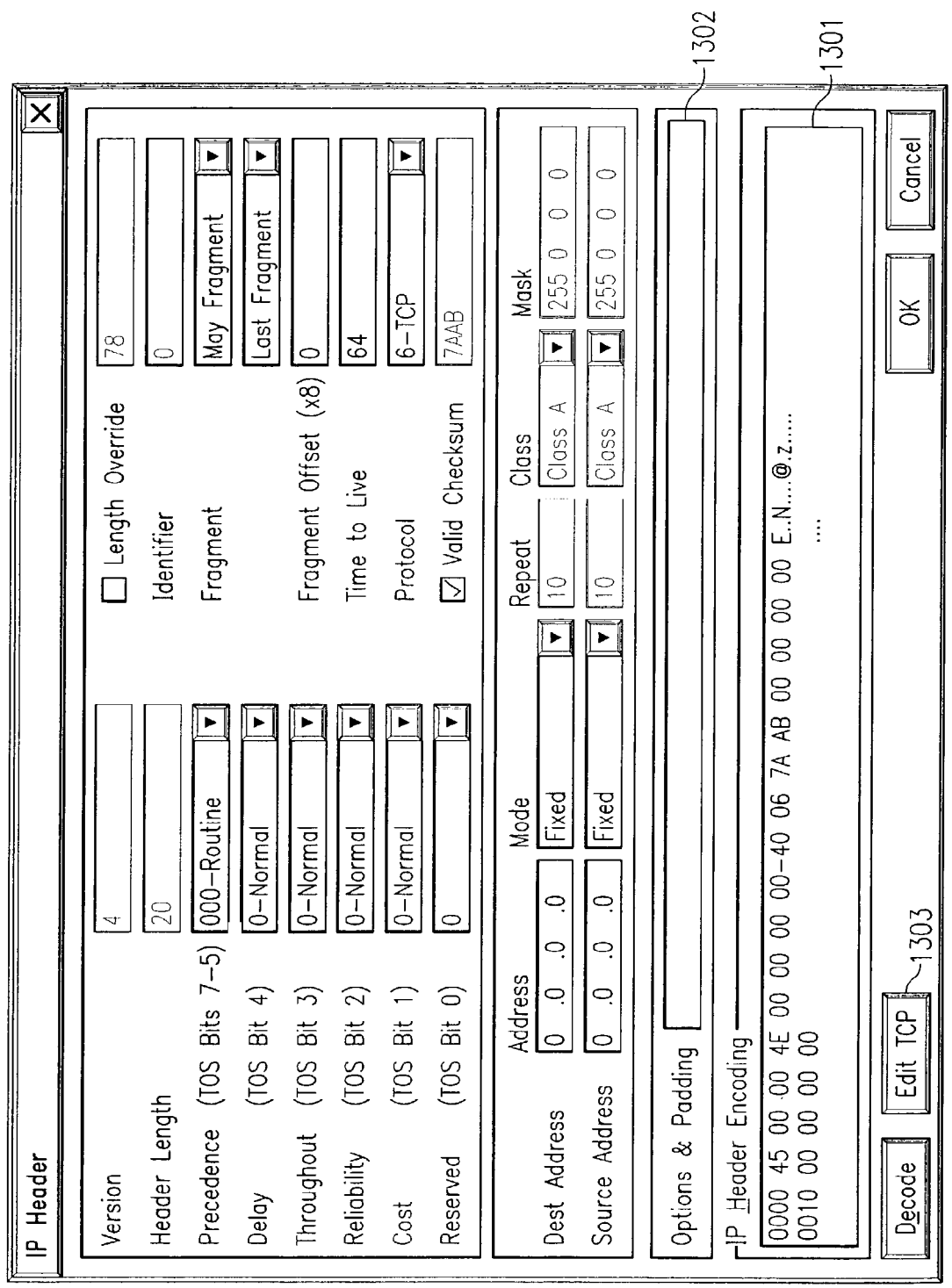

To edit the IP layer header, the user clicks Edit button 1209, and a second window 1300 opens, as shown in FIG. 13. Screen 1300 allows the user to edit the IP protocol fields, and to see a hexadecimal encoding 1301 of the IP header—i.e. the actual bytes of data that will be transmitted. Options & Padding box 1302 allows the user to type in the hexadecimal bytes of optional field data. However, the user must know the format, length and encoding of the optional fields and must calculate the hexadecimal encoding first—i.e. there is no direct support for the actual protocol fields. Note that window 1200, FIG. 12, did not show any of the encoded PDU data.

Figure 14:
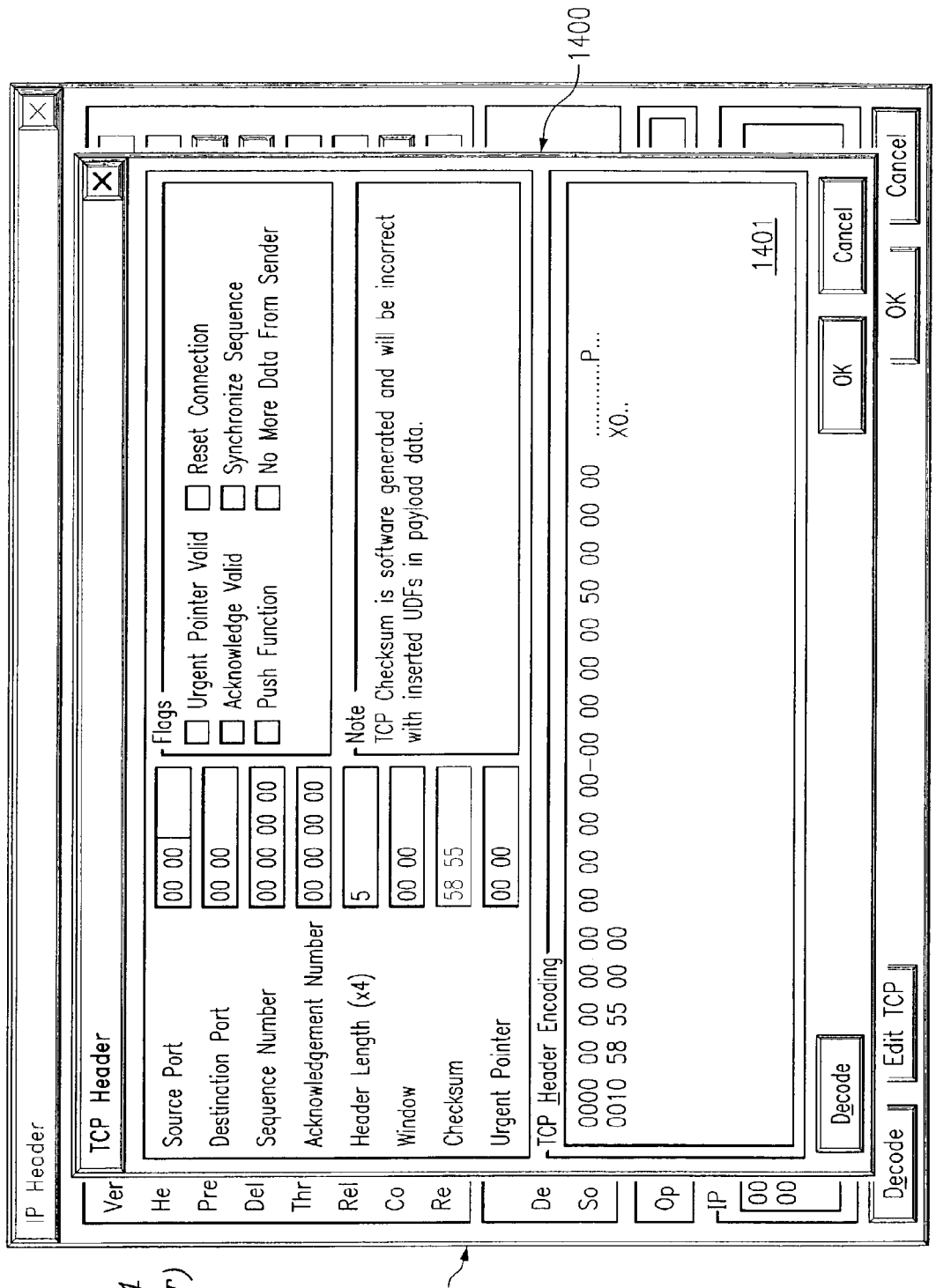

To edit the TCP layer, the user clicks on Edit TCP 1303 and a third window 1400, shown in FIG. 14, opens on top of IP window 1300. Window 1400 allows the user to edit the TCP protocol fields, and to see the hexadecimal encoding of the TCP header in box 1401. Note that the PDU encoding shown in field 1401 is just for the TCP healer—i.e. only a portion of the full PDU encoding—and is different from the encoding shown in window 1300, FIG. 13.

In the above-mentioned system, no single window contains all the PDU information, so the user must refer to several windows to understand the complete picture, and must remember the contents of each window because they can only see them one at a time. It is also not a very extensible system, because as more protocol layers are added, more windows must be added, and the UI complexity and memory load on the user grows accordingly.

Figure 1:
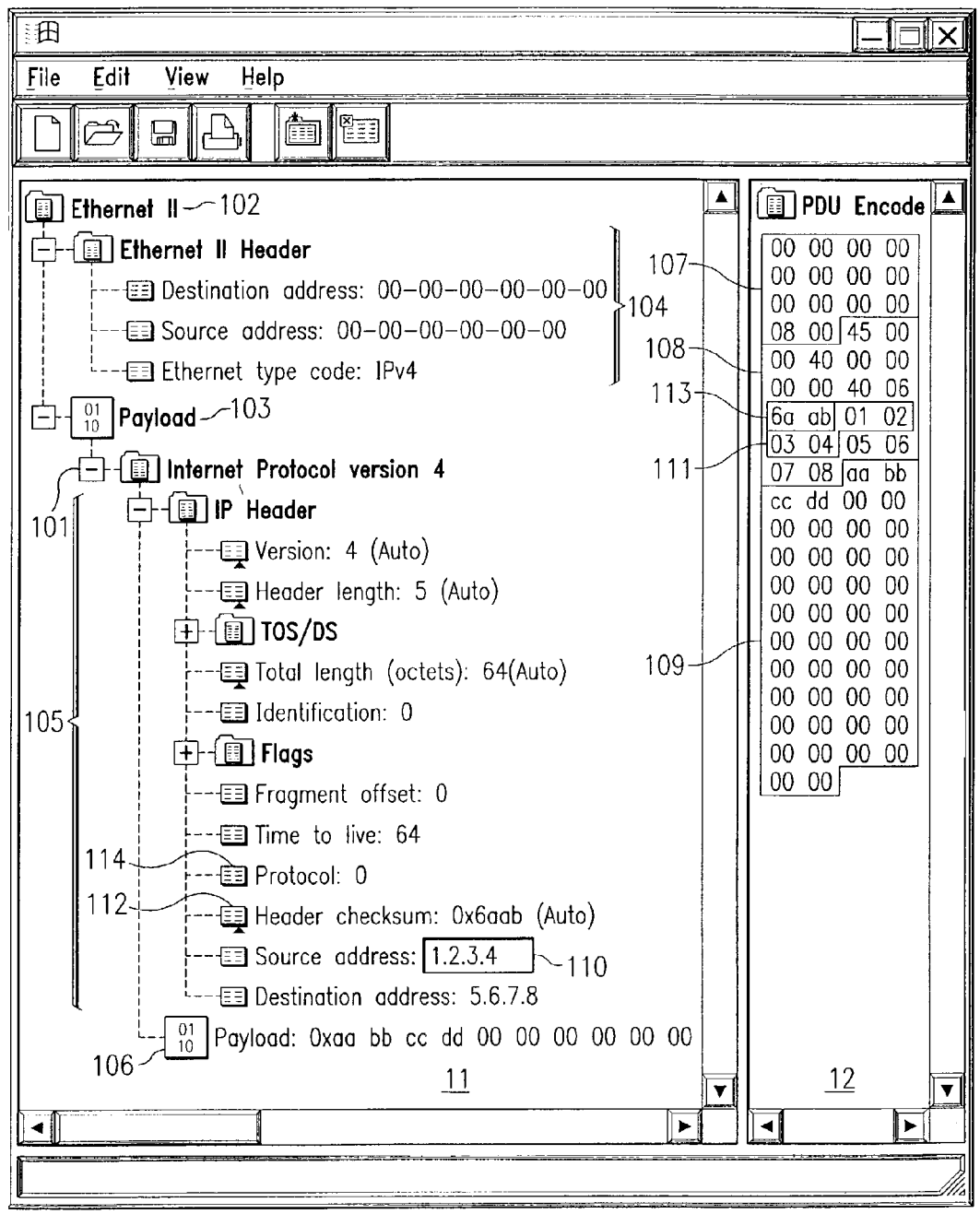
FIG. 1 is a screen view of one embodiment of the system and method of the invention.

FIG. 1 shows one embodiment of the present invention showing window 10 having two panes 11 and 12. Pane 11 shows the protocols and their fields, arranged by the order they are to be encapsulated in the PDU, while pane 12 shows the full hexadecimal encoding for the entire PDU. This example shows a 2-layer IPv4/Ethernet PDU, where the Internet Protocol Version 4 (IPv4) packet 101 is encapsulated inside Ethernet II packet 102. (That is, the Ethernet II Payload 103 contains the IPv4 packet 101.) The PDU thus consists of 3 main parts: Ethernet II Header 104, IP Header 105, and IP Payload 106. The encoding for Ethernet II Header 104 is shown in pane 12 at 107, the encoding for IP Header 105 is shown at 108, and the encoding for the IP Payload 106 is shown at 109. The user works in pane 11 and the encoding is updated, by the system, in pane 12.

For example, the "Source Address" field is shown selected in box 110, where the user can enter or modify the source address value. When the user enters (or changes) the address value, and hits the Enter key, the proper hexadecimal encoding is updated in pane 12 at the proper location 111. In addition, any "automatic" protocol fields, for example the Header Checksum field 112, will be automatically re-calculated by the system and re-displayed, both in field 112 and in the encoding in pane 12 at position 113, unless the user has selected to override an automatic value, as explained later.

Figure 2A:
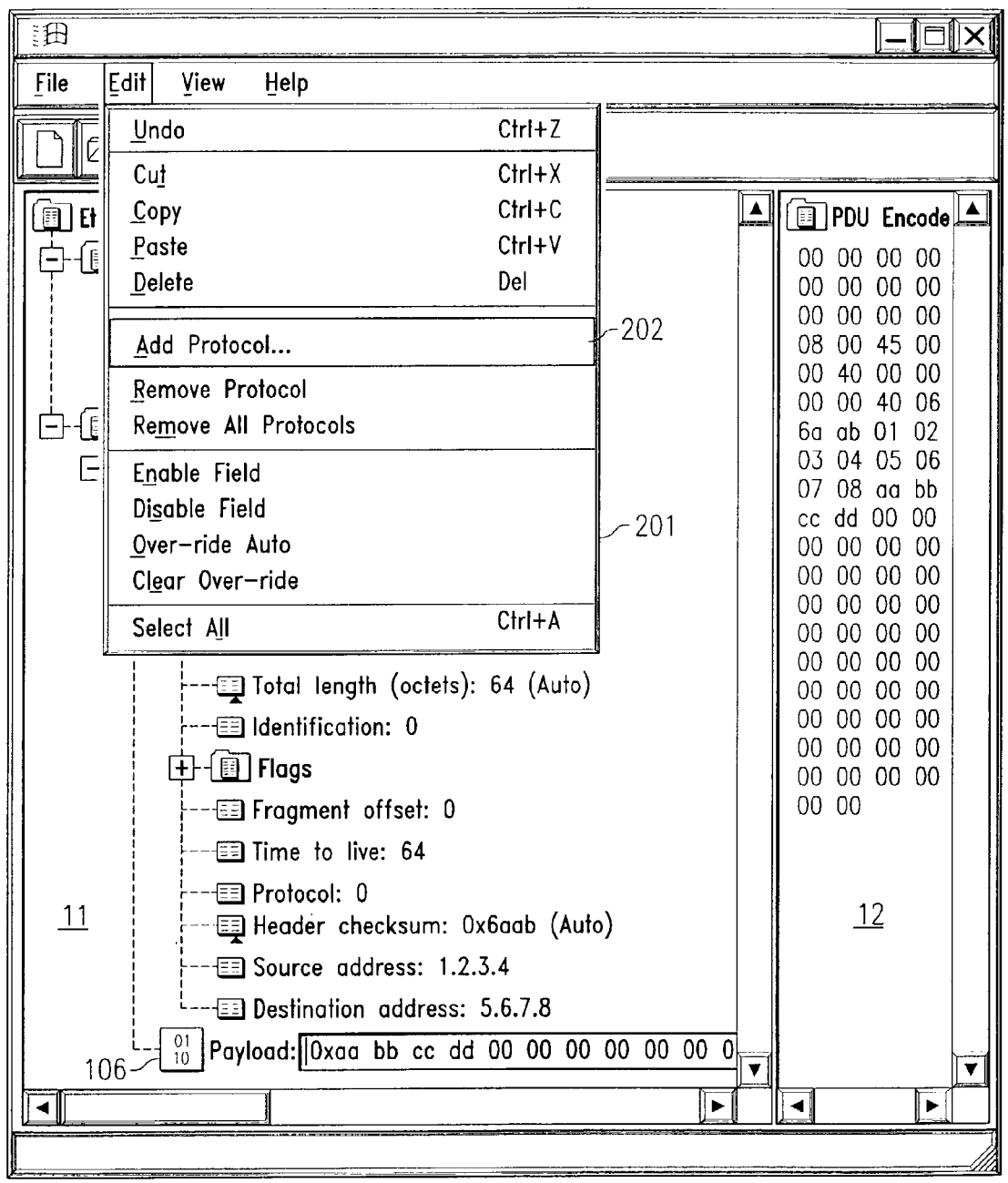
FIGS. 2A and 2B show screen views of the method of adding a protocol layer to a PDU.
Figure 2B:
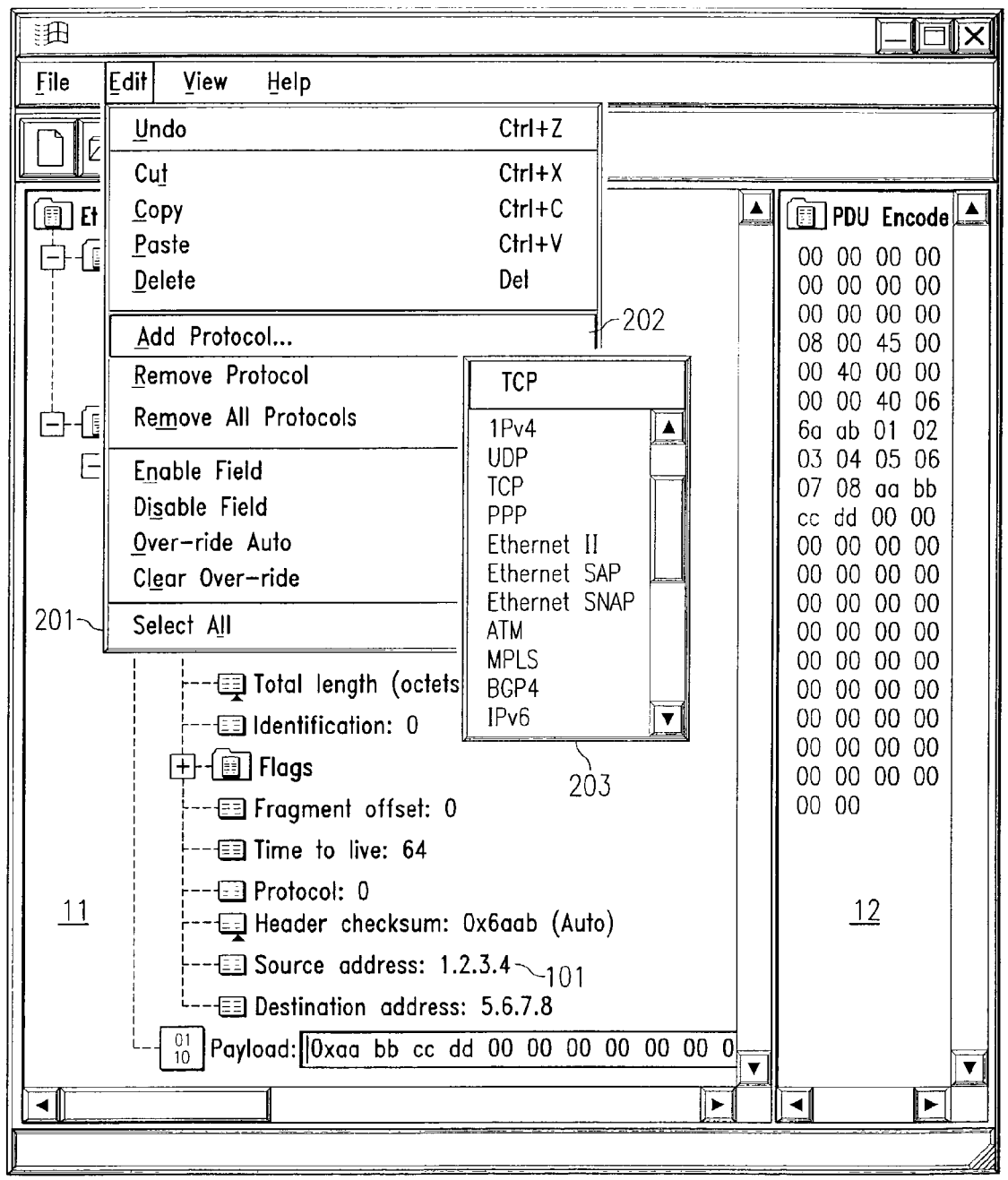

To add another protocol layer to the PDU (for example, a TCP layer), the user places the computer cursor at the desired location for the new protocol by selecting IP Payload field 106, and then pops up menu 201, FIG. 2A. The user then selects "Add Protocol" command 202, and then selects "TCP" from popup list 203, FIG. 2B.

Figure 3:
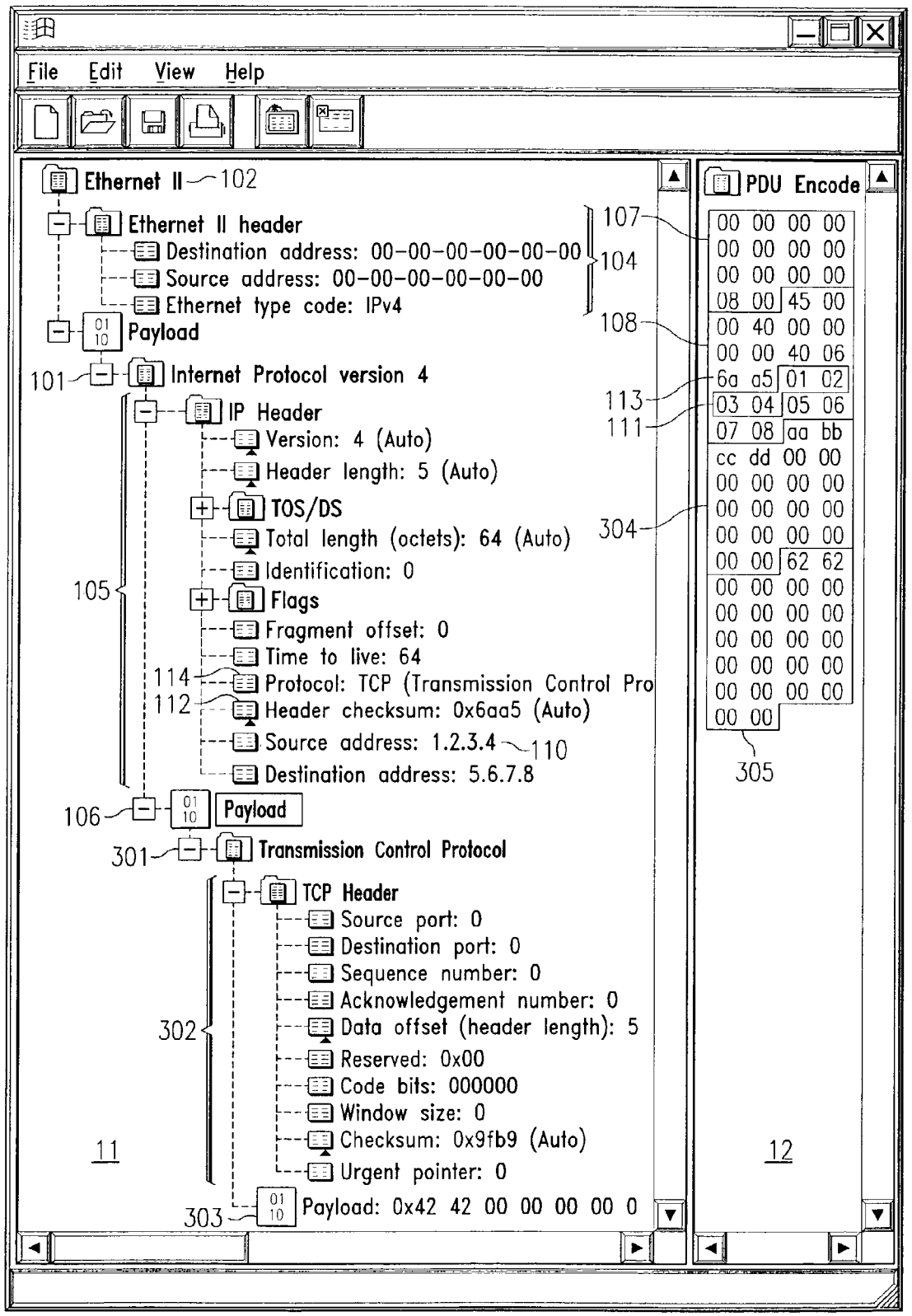
FIG. 3 is a screen view of a PDU with all its hierarchical layers after the new protocol has been added.

FIG. 3 shows the added Transmission Control Protocol (TCP) 301, which has replaced the previously-editable contents of IP Payload 106, creating a 3-layer TCP/IPv4/Ethernet PDU, similar to the one discussed above with respect to existing systems. That is, new TCP packet 301 is encapsulated inside IPv4 packet 101, and in turn IPv4 packet 101 is encapsulated inside Ethernet II packet 102. Thus, the PDU now consists of 4 main parts: Ethernet II Header 104, IP Header 105, TCP Header 302, and TCP Payload 303. Note that the added protocol layer does not necessarily make the PDU longer—in this case the TCP packet simply replaces the payload of the IP packet which encapsulates it.

In pane 12, the hexadecimal encoding for new TCP Header 302 is shown at 304, and the encoding for TCP Payload 303 is shown at 305. TCP encoding 304/305 replaces the previous encoding for IP Payload 109 FIG. 1. The system has also automatically set the IP Header Protocol field 114, changing the value from "0" (FIG. 1) to "TCP" (FIG. 3), as required by the IP protocol. In addition, Header Checksum field 112 has been automatically re-calculated by the system and re-displayed, both in field 112 and in encoding 113 in pane 12.

In FIG. 3 window 10, the complete 3-layer TCP/IP/Ethernet PDU can be modified and/or edited in a single scrollable view, since all fields of all layers are presented in the interactive tree control (in pane 11), with the complete hexadecimal encoding of the whole PDU displayed next to it (in pane 12). The displayed PDU encoding in pane 12 is at all times automatically synchronized with the protocol fields values in pane 11, such that when the user makes a change, or an addition in pane 11, the proper corresponding change is made in pane 12. For example, IP Source Address field 110 has the value "1.2.3.4", and the corresponding hexadecimal encoding "01 02 03 04" is shown at 111. If the user were to change the value at 110 to "5.6.7.8", then after Enter is pressed, the hexadecimal encoding at 111 would automatically change to "05 06 07 08". To make this relationship between the fields in pane 11 and pane 12 clearer to the user, the encoding for the selected field in pane 11 could be highlighted in pane 12 for example, or could be shaded or color-coded. The process of adding protocol layers can be continued indefinitely in pane 11, with the only added complexity being the need to scroll up and down in pane 11, (and possibly in pane 12) as the PDU grows. Thus, the present invention provides a flexible, dynamic display of any number of protocol layers, which is easily manipulated and edited by the user. The number of layers which it could handle is theoretically unlimited (except perhaps by computer memory), but in practice no more than 7 layers would be required of a PDU Builder, since the ISO standard network model has 7 protocol layers.

Figure 4:
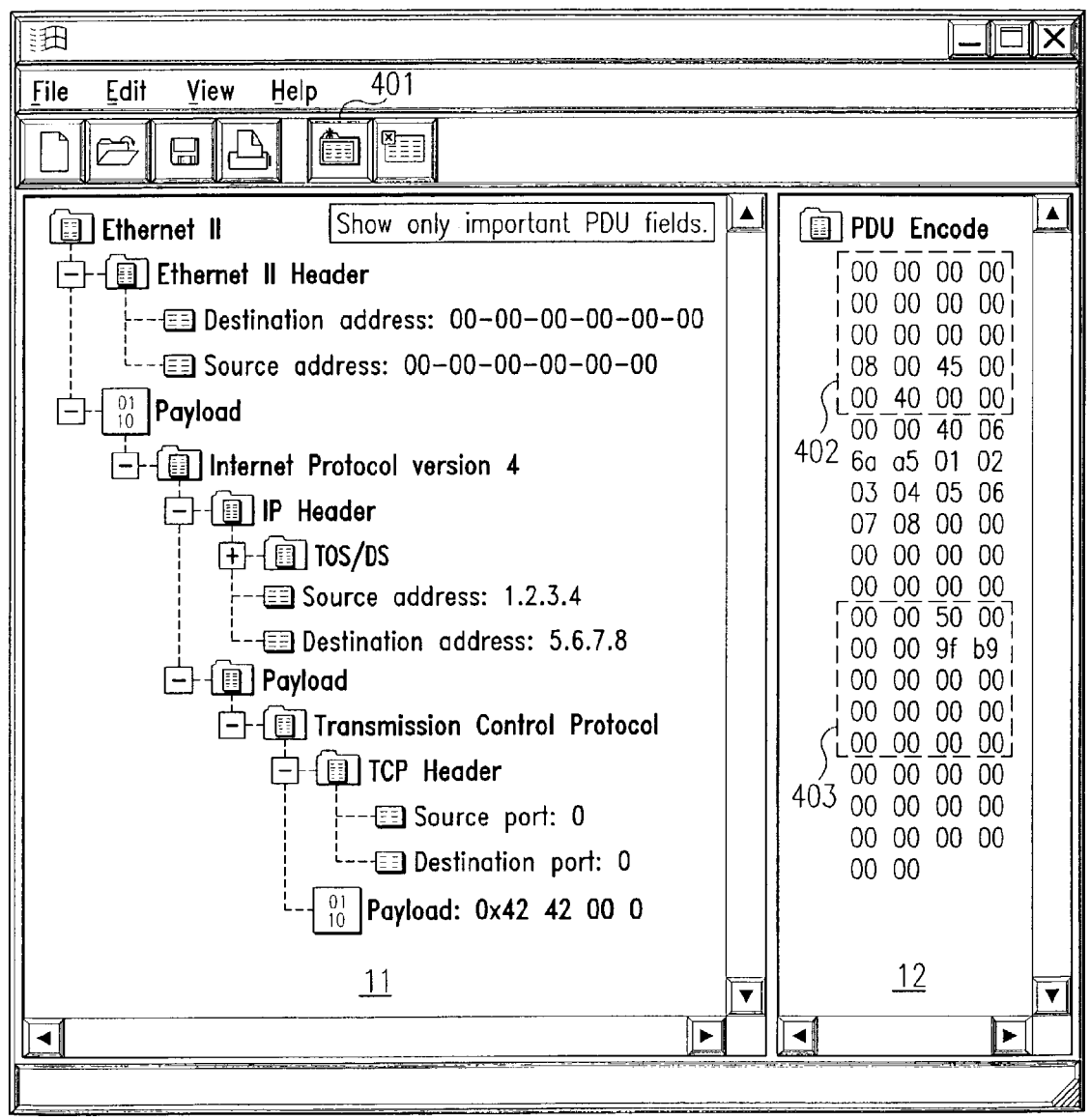
FIG. 4 is a screen view of just the primary data fields of a PDU.

If many protocol layers are added to a PDU, the tree display will become larger, and will thus require more scrolling of the window. However, in many cases, the user does not need to see or edit all the fields of each protocol header, and only the most important or frequently used ones need be viewed. In this case, the user may simplify the display by selecting a viewing option that shows only fields designated as being "important", i.e. of primary interest to the user. This is shown in FIG. 4, where window 40 has replaced window 10, and is accomplished by the user selecting the appropriate viewing option via button 401. With this option turned on, in pane 11 only a select sub-set of the full PDU is displayed, consisting of the "primary" protocol fields for each layer. This will be more compact and convenient for editing large PDUs. The user can at any time turn this option off, and the entire PDU would again be displayed, as before. Another option would be to again show only the sub-set of important PDU fields, as in FIG. 4 pane 11, but also highlight the corresponding fields in the PDU encoding in pane 12, as shown at 402 and 403.

Figure 5:
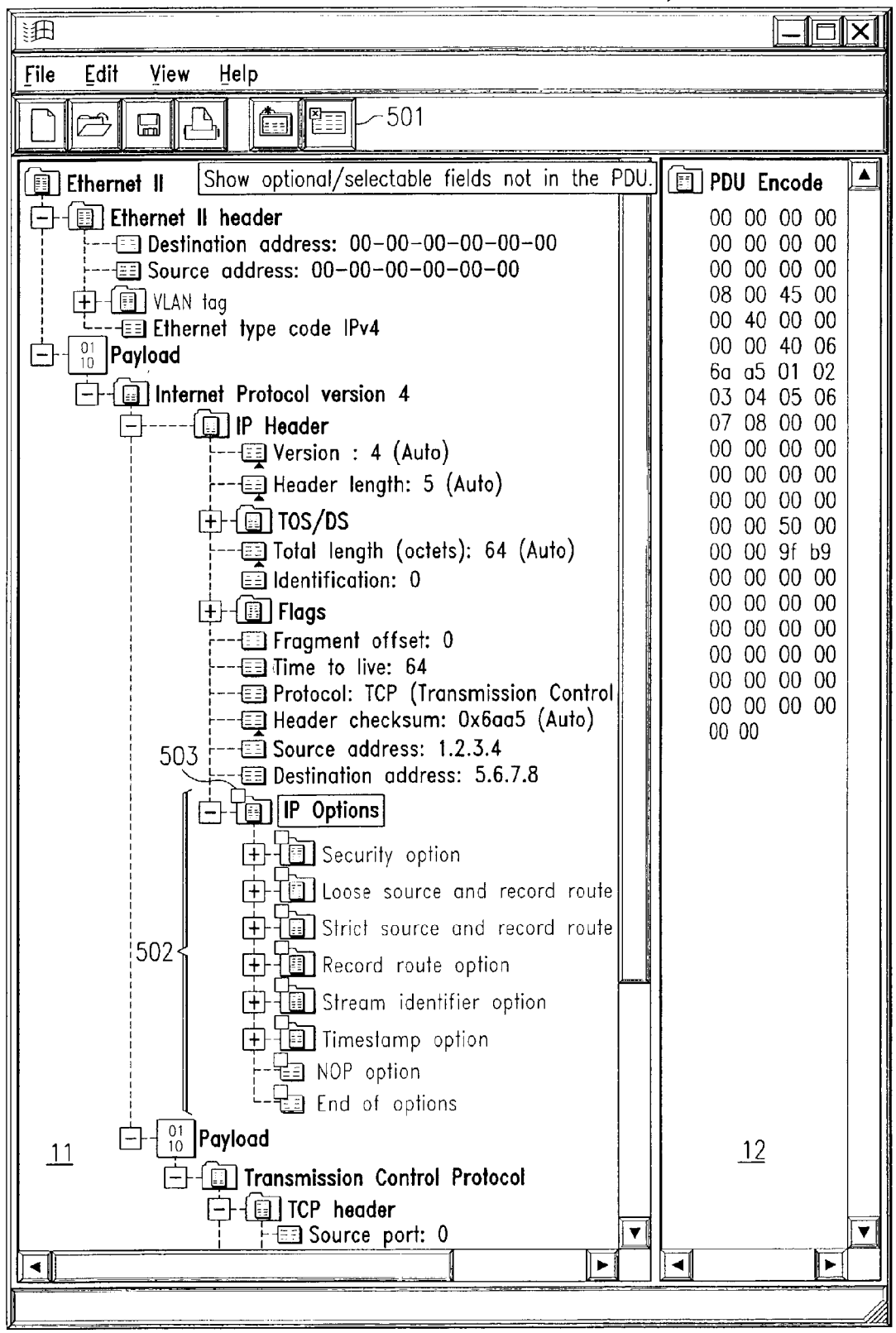
FIGS. 5, 6 and 7 are screen views of one method of adding optional protocol fields to a PDU.

Most fields defined by a protocol are "mandatory", that is, they must always be included in any PDU that conforms to the given protocol. By contrast, "optional" fields are special fields defined by the protocol that may or may not be included in a particular PDU, at the user's discretion. In this embodiment, optional fields are not initially displayed in the interactive tree control. However, if and when the user wishes to see or edit such fields, the user may select a viewing option that adds them to the display. This is shown in FIG. 5 window 50, and is achieved by the user selecting the appropriate viewing option via button 501.

For example, with this option turned on, in pane 1 the additional fields "IP Options" are shown at 502. Such fields are specially marked with a selectable "Check Box" icon 503 overlaid on the normal icon, to indicate to the user that they are optional, and may be selectively added to or removed from the PDU. When unselected, the fields are also displayed with a different font or color (e.g. gray) to indicate to the user that they are not currently included in the PDU, but are fields which may be potentially added if desired. (In addition, because the fields are not included in the PDU, no values are displayed for the fields, and the user is not able to edit them.) If the user wishes to add an optional field to the PDU, the user does so by clicking on check-box icon 503 next to the desired optional field, and it changes appearance to indicate that it is now included in the PDU.

Figure 6:
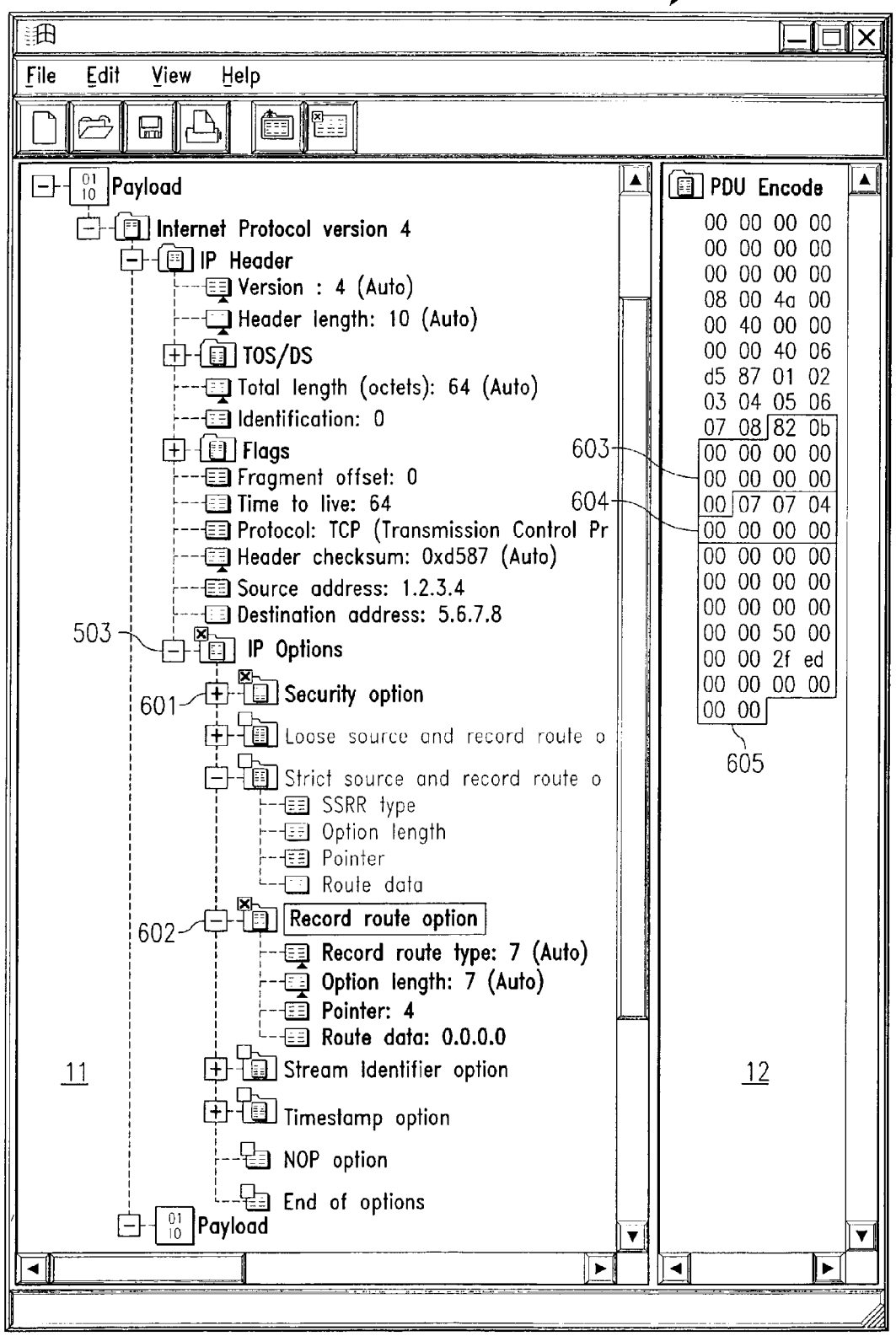

FIG. 6 shows window 50 after field IP Options 503, Security Option 601 and Record Route Option 602 have been selected by the user and added to the PDU. The font and/or color of these fields have been changed to the normal font/color of mandatory fields (e.g. black instead of gray), to indicate to the user that these fields are now included in the PDU. (The other optional fields remain in the special font/color.) FIG. 6 also shows the tree node for Record Route Option 602 expanded to reveal the sub-fields it contains. As these sub-fields are now included in the PDU they are also shown in the normal font/color, and the values are displayed and the user may now edit them.

The PDU encoding in pane 12 has also been automatically updated by the system to reflect the addition of the selected optional fields. The new fields have been inserted at the end of the IP Header, just before the IP Payload, with the IP Payload being moved down accordingly within the PDU, to fit in the new fields. In addition, in order to keep the overall length of the PDU the same as before, the IP Payload has been shortened by the same number of bytes as were inserted for the optional fields. The data pertaining to field 601 in pane 11 is shown at 603 in pane 12, while field 602 in pane 11 is shown at 604 in pane 12, and the shortened IP Payload (as compared to 109 in FIG. 1) is shown at 605.

Figure 7:
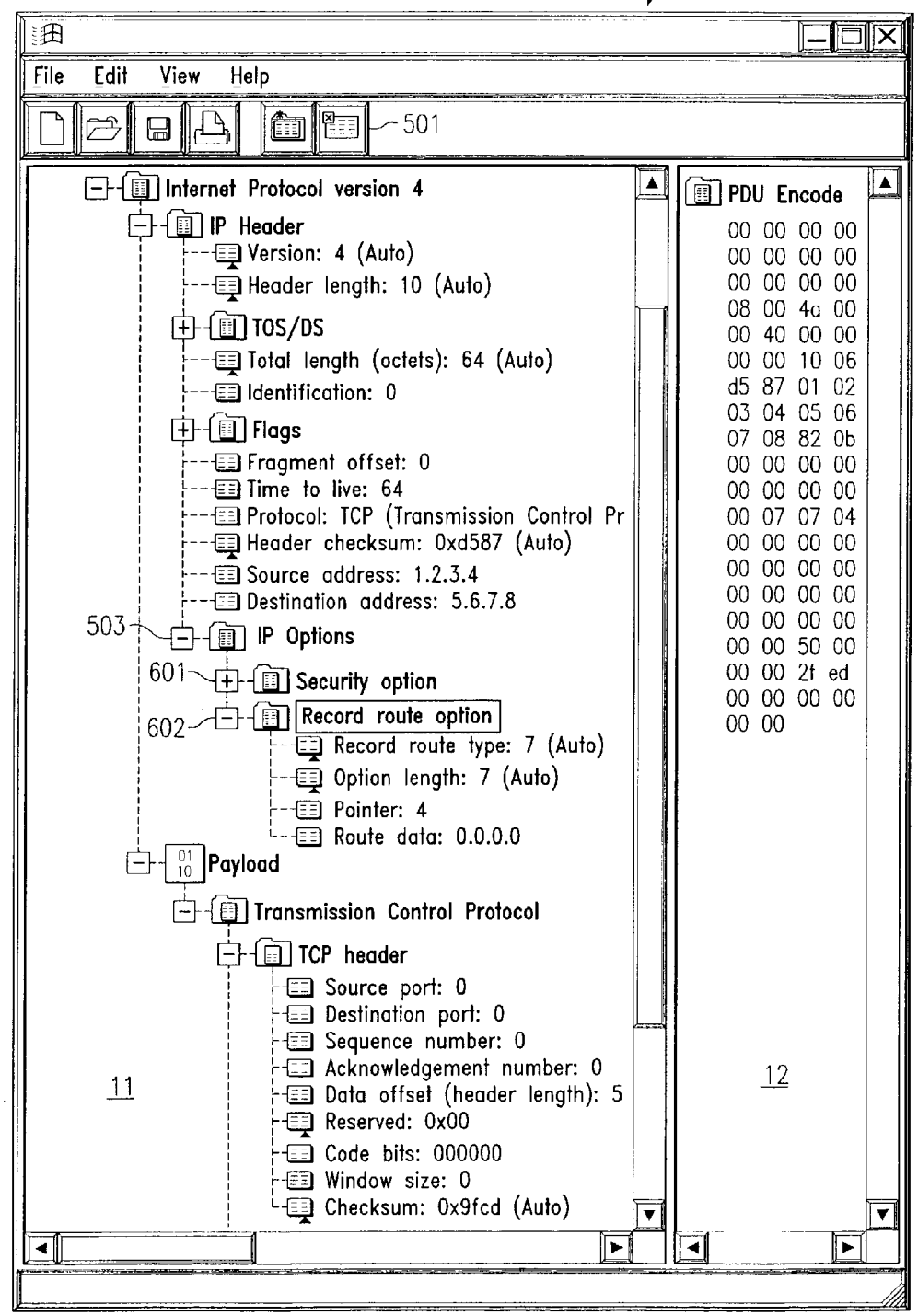

FIG. 7 shows window 50 in which the viewing option for optional fields at button 501 has been turned off, and after the optional fields in the previous example have been added to the PDU, as shown in pane 12. Optional fields 503, 601 and 602 are now included in the PDU, and so are still displayed in the tree control, even though the other (non-selected) optional fields are now hidden. Optional fields that have been added to a PDU may be later removed from the PDU by simply clicking on the Check Box icon again to deselect the field. The corresponding encoded data bytes in pane 12 would then be removed, and the Payload extended to its previous length. (Note that some information in pane 11 is below the window bottom edge and the window must be scrolled to view this portion. The scrolling feature allows the entire PDU to be displayed in a single window. The same would be true for pane 12 if the data grew longer than one window length.)

Figure 8:
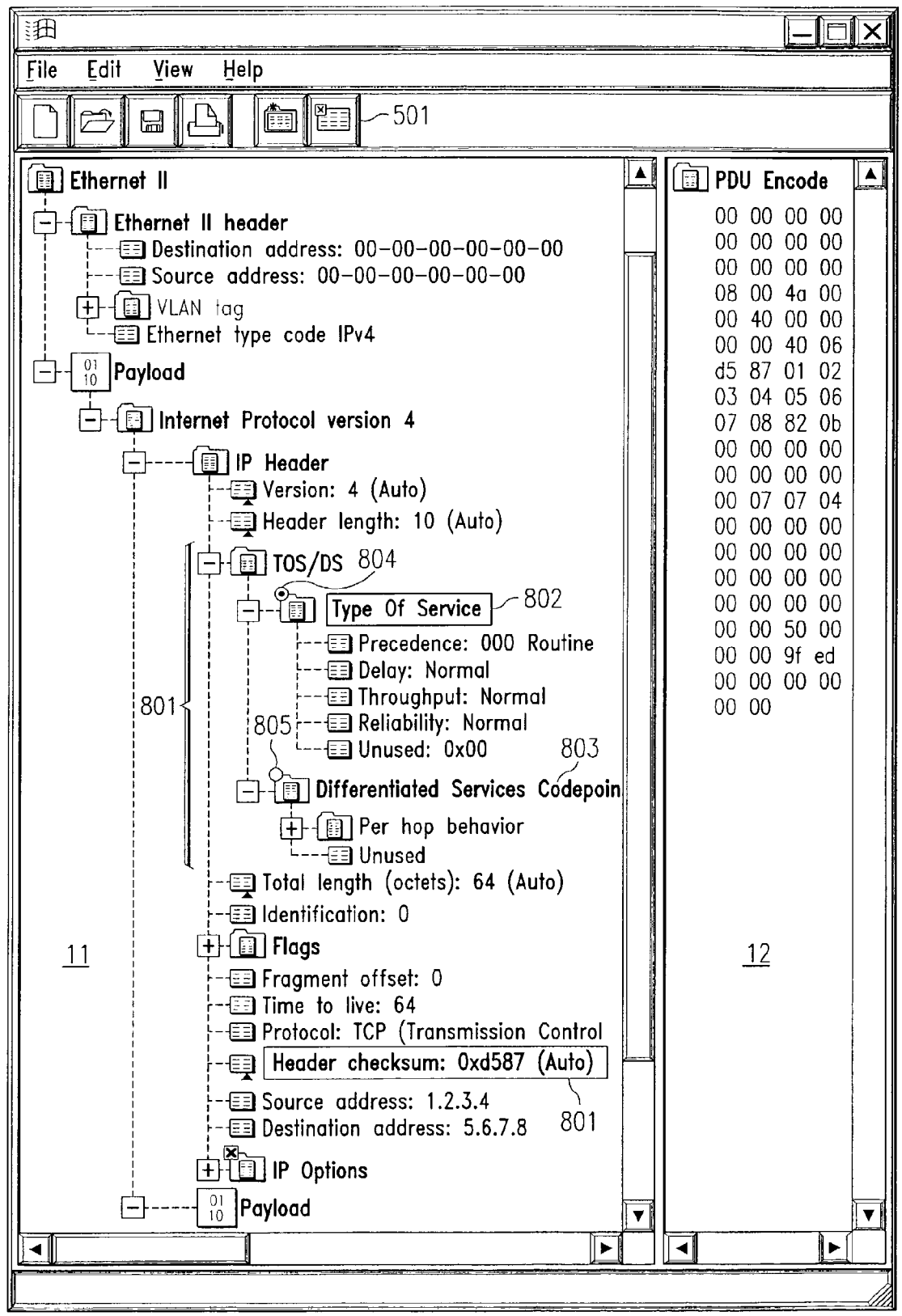
FIG. 8 is a screen view of another method of adding optional protocol fields to a PDU.

FIG. 8 shows screen 80 in which the Optional Field viewing option at button 501 is turned back on again. FIG. 8 also shows the tree node for TOS/DS field 801 expanded to reveal its sub-fields, which are Type Of Service 802 and Differentiated Services Codepoint 803. This demonstrates a second type of optional field, in which only one of the available optional sub-fields in a group may be selected at a time. Such fields are selected in a similar way to the first type of optional field (as discussed above), but when an optional field in a group is selected by the user, the previously selected field is automatically deselected by the system. To indicate this different behavior, the square "Check Box" icon is replaced with a rounded "Radio Button" icon, similar to standard GUI controls. For example, the Radio Button icon at 804 is filled to indicate that it is the selected option and thus included in the PDU, and icon at 805 is unfilled to indicate that it is not selected.

Most fields in a PDU must have a meaningful value specified for them by the user. However, certain fields are defined as being "automatic" fields, which means that the value of the field is pre-set to a special value, or derived by the system from the state of the PDU, rather than being specified by the user. An example of such a field is Header Checksum 112, shown in FIG. 1. The value of this field is automatically calculated by the system, based on a mathematical algorithm whose inputs are the value of the other fields in the IP Header (in the manner specified by the standard IP protocol). This calculated value is automatically updated and re-displayed by the system whenever other fields in the header are changed by the user, as described above. If desired, automatically derived fields can be indicated to the user by displaying a modified icon, or by displaying the field's value in a different color (e.g. black instead of blue), or by appending the phrase "(Auto)" after the value, or by a combination (or all) of the above. By default, the user is not able to edit the values of such fields, because the system needs to set them.

In some cases the user may wish to override the automatic field behavior described in the previous paragraph, and manually enter a fixed value for a given field. If the user does this, the PDU would in general no longer be a valid PDU according to the rules of the protocol. However, such PDUs are useful in certain applications, for example testing the error-handling properties of network devices.

Figure 9:
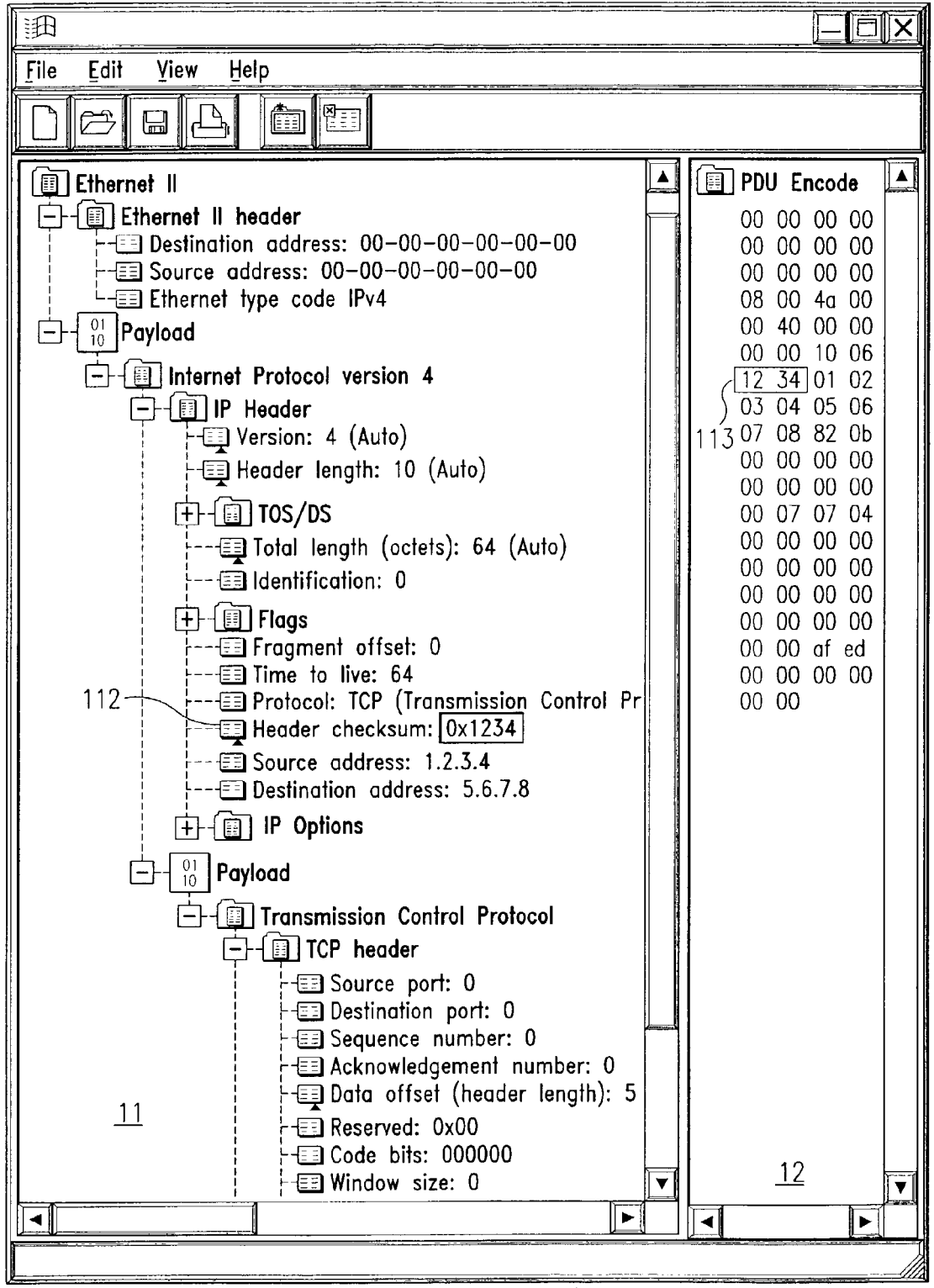
FIG. 9 is a screen view of the manual override of the value of an automatically-derived field.

As an example, FIG. 9 shows window 90, where Header Checksum field 112 has been over-ridden by the user. The user achieves this by clicking on the field's icon, and then the field value becomes editable by the user, so the user can enter any value, e.g. "0"x1234", whether it be valid or invalid. To indicate to the user that the field value is no longer automatically calculated by the system, the icon changes color, and the phrase "(Auto)" is removed from the field. To further indicate that the field's value is no longer valid (as defined by the protocol), the color of the value text could change, e.g. to red. In addition, the encoding shown at 113 in pane 12 will now reflect the value entered by the user, e.g. "12 34", and not the automatically calculated value, e.g. "6a ab" as shown in FIG. 1. At any time, the user may revert back to the automatic behavior by clicking on the field's icon again. The field's icon, text and coloring will then return to their normal state and the field's value will be automatically re-calculated and updated to show its correct value, in both pane 11 and pane 12.

Figure 10A:
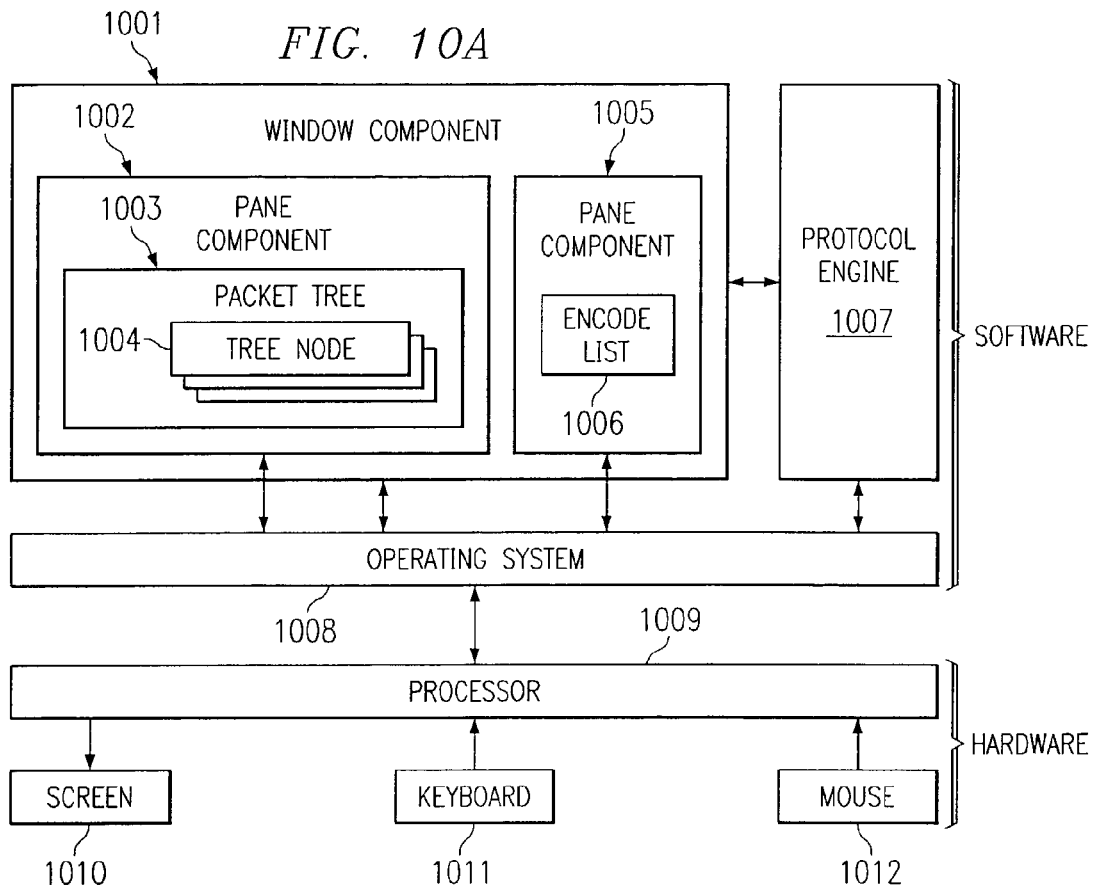
FIGS. 10A, 10B, 11A and 11B show diagrams of system operation showing one embodiment of the teachings of the invention.

For one embodiment, the invention may be implemented in software running on a general-purpose computing device. For example, FIG. 10A shows a typical implementation based on the Microsoft Windows NT operating system 1008, running on an Intel Pentium III processor 1009 with 256 Mb of memory, and with a video screen 1010, keyboard 1011 and mouse 1012 attached. In this example, the software embodying the invention is implemented using an object oriented software architecture and the C++ programming language. The main objects in the software are:

Window Component 1001, which provides the GUI frame window, menubar and toolbar, and processes user command selections from the menubar and toolbar; Pane Components 1002 and 1005, which each provide graphics area, with facilities for drawing graphics and text, and processing user input in the form of mouse and keyboard events sent by the Operating System 1008;

Packet Tree 1003, which is a special-purpose "Tree Control" that displays a hierarchical arrangement of nodes, similar to the standard Tree Control used in the Microsoft Windows User Interface, but with additional features required for implementing the inventive concepts described herein;

Tree Node 1004, which displays the icons, lines and text for a single node in the Packet Tree, and processes user mouse and keyboard input, to allow the user to enter fields values, pop up menus, etc; and Encode List 1006, which provides facilities to lay out and display a given PDU in standard hexadecimal notation.

The example implementation also uses services provided by Protocol Engine 1007, which is essentially a database providing protocol information in a generic format, together with facilities to create, store and modify PDU data. Note that Protocol Engine 1007 is an external software component used by the embodiment to help implement the Graphical User Interface described herein. The Protocol Engine used in the example implementation is described in the patent application titled "Building Packets of Data", Ser. No. 10/266,507 filed on Oct. 8, 2000 in the name of Geoff Smith and assigned to Agilent Technologies, Inc., which application is hereby incorporated by reference herein. Using Protocol Engine 1007 substantially simplifies the implementation of the system, because no detailed protocol knowledge needs to be embedded in the software code, but instead this information is gathered at run-time from an external source. This offers the advantage that the GUI can be easily extended with additional protocols without needing to design additional GUI screens or make any change to the design or implementation of the GUI code. Thus, the size and complexity of the GUI code does not grow as new protocols are added to the Protocol Engine over time. Users may add additional protocols to the engine, including proprietary and custom protocols, which will then appear in the GUI without modification of the underlying GUI software.

It should be noted that the system and method described herein are not dependent on the embodiment shown. The system could also be implemented with any other protocol engine that provided similar services or indeed without any such engine at all. That is, the inventive concepts could be implemented by hard-coding the protocol knowledge in the GUI software itself, with no loss of usability or the other advantages described herein. However, without a protocol engine, the GUI software code would be much larger and more complex. Most prior art PDU builder GUI's have used the hard coding approach over protocol engines, due to the unavailability of such an engine, and the difficulty of their successful implementation.

Referring again to FIG. 10A, in order to display a complete PDU, Packet Tree 1003 creates many instances of Tree Node objects, one for each protocol field in the PDU. The software code in Packet Tree 1003 creates and manages its contained Tree Nodes 1004, and lays them out on the computer screen in the hierarchical display. It also processes user input to interactively hide or reveal the sub-nodes at each hierarchical node. To display a particular PDU, Packet Tree 1003 needs information about the protocols used, in order to create appropriate Tree Nodes to display the protocol fields, their state and values. Packet Tree 1003 gets this information at runtime, by querying Protocol Engine 1007, which provides the list of available protocols and their constituent data fields and properties. Packet Tree 1003 then uses the facilities provided by Protocol Engine 1007 to create instances of PDUs, to query the values and state of their fields, and to modify said values and state, in response to user input. Protocol Engine 1007 also implements the rules of each protocol, and does the calculation of field values, which are displayed by the relevant Tree Nodes.

Figure 10B:
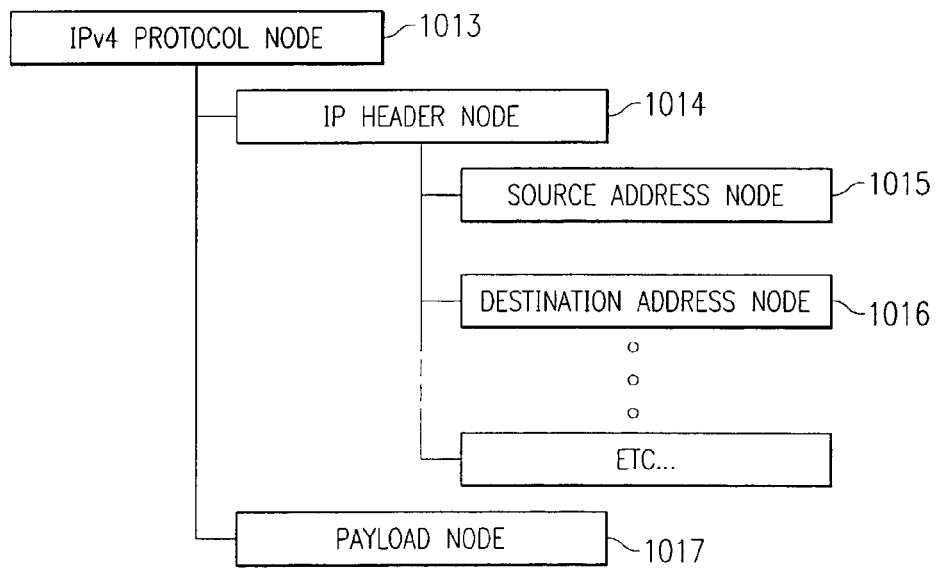

FIG. 10B shows the Tree Node objects created in a typical instantiation of an IPv4 PDU, whereby each node corresponds to one field in the PDU. Each Tree Node stores reference information (e.g. an index) for the corresponding field in the PDU stored in the Protocol Engine. The Packet Tree then uses this reference information to retrieve and modify field value and state information in the protocol engine, as directed by the user.

Figure 11A:
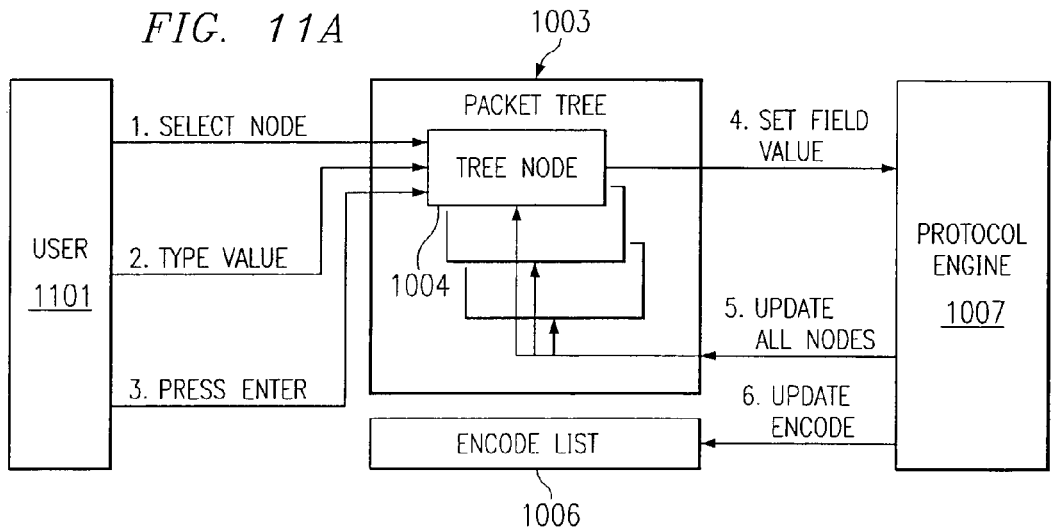

FIG. 11A shows an example of the implementation of the method for editing a protocol field value in an existing PDU displayed by the GUI. User 1101 selects a Tree Node 1004 in Packet Tree 1003, by clicking the mouse button when the screen cursor is displayed over the Tree Node on the screen. The Tree Node then becomes available for editing, and User 1101 types in a new value using the keyboard. As the user types, Tree Node 1004 responds by displaying the characters entered by the user, and responding to editing commands such as Backspace, Delete, Copy, Paste, etc. When the user finishes entering the value, the user presses the Enter key, and Tree Node 1005 responds by sending the new value to Protocol Engine 1007. The system then retrieves updated information about the value and state of every protocol field in the PDU. Lastly, Encode List 1006 retrieves from Protocol Engine 1007 the updated encoded PDU data and displays it on the screen. Note that at this point all PDU information displayed on the screen has been updated, even though the user has modified only one protocol field. This is because of the possibility that other fields may have changed as a result of the user's change, such as checksum re-calculations and so on, so it is necessary to ensure that all displayed information is up to date and correct.

Figure 11B:
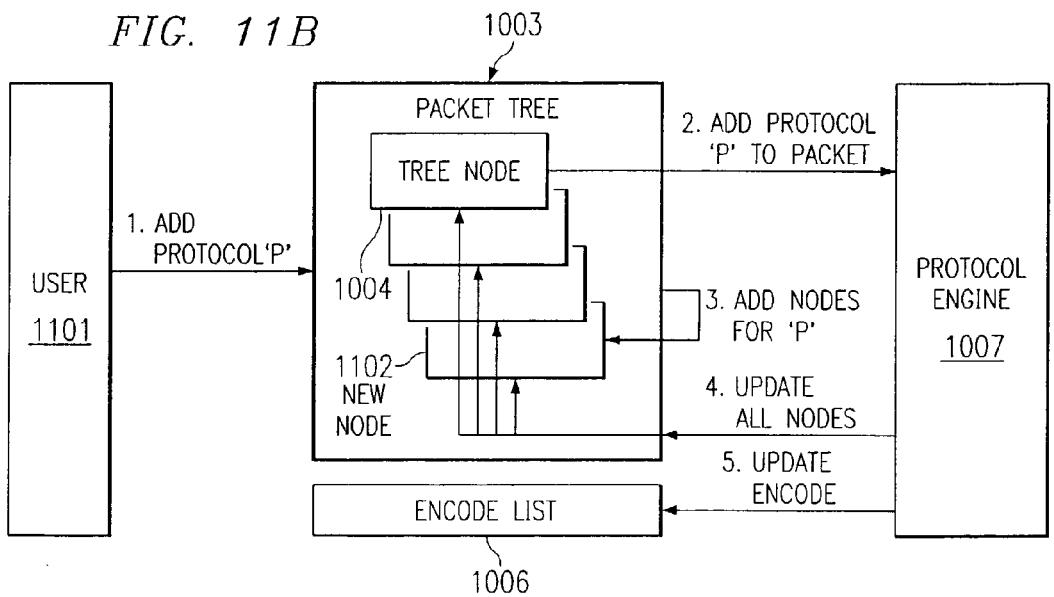

FIG. 11B shows an example of the implementation of the method for adding a protocol layer to an existing PDU displayed by the GUI. User 1101 selects the "Add Protocol" command from the menubar in Window Component 1001 FIG. 10A, and selects the desired protocol. Packet Tree 1003 responds by requesting Protocol Engine 1007 to add the given protocol layer to the existing PDU stored therein. After retrieving protocol information for the new layer from Protocol Engine 1007, Packet Tree 1003 creates new Tree Nodes corresponding to all the data fields present in the new protocol layer, for example New Node 1102. Then the tree nodes and encode list are fully updated again, as in the previous example.

The inventive concepts described herein can be advantageously practiced on any computer having capabilities similar to the Microsoft Windows NT operating system, an Intel Pentium III processor with 256 Mb of memory and a standard graphics processor providing at least 1024×768 pixel resolution and at least 256 colors, and with a video screen, keyboard and mouse attached.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for creating and editing an encoded data packet comprising a plurality of protocol fields, each protocol field having a protocol value corresponding to a protocol layer, said method comprising:
   generating simulated network traffic to test network equipment, wherein generating simulated network traffic includes:
      displaying on a first pane of a computer window a hierarchical order of said protocol layers and values of said protocol fields of said encoded data packet, each protocol layer comprising a header describing said protocol layer, said header being displayed with said protocol value corresponding to that header, wherein said protocol values of said protocol fields of a plurality of different protocol layers are editable within said first pane while said protocol values of said protocol fields of said different protocol layers are displayed within said first pane;
      displaying on a second pane of said window said entire encoded data packet for transmission as simulated traffic;
      editing the encoded data packet; and
      transmitting the edited encoded data packet over a communications network.

2. The method of claim 1 wherein said hierarchical order is tree-structured and whereby each node of the tree is optionally opened to hide, or closed to reveal, said protocol layers and values of said protocol fields in a lower level down of the hierarchy.

3. The method of claim 1 wherein said encoded data packet is displayed in standard hexadecimal notation, and wherein each of said values of said protocol fields is displayed in a notation that depends on said protocol layer corresponding to that protocol field.

4. The method of claim 1 wherein said encoded data packet is a PDU.

5. The method of claim 1 wherein said values of said protocol fields displayed on said first pane are editable and wherein said encoded data packet displayed on said second pain remains unchanged while said values of said protocol fields are edited.

6. The method of claim 5 wherein upon command said encoded data packet displayed on said second pane is changed in response to said editing of said protocol fields on said first pane.

7. The method of claim 1 wherein when one of said protocol fields is selected, a portion of said encoded data packet displayed on said second pane is identified as being associated with said selected protocol field.

8. The method of claim 1 wherein when one of said protocol fields is selected, a portion of said encoded data packet displayed in said second pane of said window becomes available for modification.

9. The method of claim 1 further comprising
   providing a menu having additional protocol layers that can be optionally added to said hierarchical display at a location selected by a user, wherein when said user selects one of said additional protocol layers,
   encoded data corresponding to said selected protocol layer are added at the proper location with said encoded data packet.

10. The method of claim 9 wherein upon command any selected protocol layer may be removed from said hierarchical display, and wherein the encoded data corresponding to said selected protocol layer are removed from said encoded data packet.

11. The method of claim 1 wherein, under selective control, an optional field defined by one of said protocol layers in said hierarchical order becomes visible at a location within said hierarchical order in said first pane determined by that protocol layer.

12. The method of claim 11 wherein upon a command entered by a user, said optional field is added to said encoded data packet, and wherein the encoded data corresponding to said selected optional fields is added to said encoded data packet at a location in said second pane determined by said optional field.

13. The method of claim 11 wherein upon a command entered by a user, an optional field in said hierarchical order is removed from said data packet, and wherein said encoded data corresponding to said selected optional fields are removed from said data packet.

14. The method of claim 1 wherein all of said hierarchical order is displayed on a single scrollable display.

15. The method of claim 14 wherein all of said encoded data are visible in said second pane regardless of the visibility of said protocol layers in said first pane.

16. The method of claim 14 wherein said encoded data displayed in said second pane indicates that a protocol layer has been selected for visibility in said first pane.

17. The method of claim 1 further comprising a command for changing said hierarchical order,
wherein, upon completion of a change in said hierarchical order, said second plane display changes to reflect said changes to said data packet reordering said data packet according to said change in said hierarchical order.

18. The method of claim 1 further including
adding defined protocol layers to said first pane display, adding data to said data packet corresponding to said added protocol layers, wherein said second pane display is automatically changed to reflect changes to said encoded data packet which result from said added protocol layers.

19. The method of claim 1 wherein the number of said layers is independent of a display size of said window.

20. The method of claim 1 wherein additional protocol layers are selectable by selection from a menu.

21. The method of claim 1 wherein only certain of said protocol fields are visible in said first pane for a period of time.

22. A system for displaying packets of encoded data whose content and format is defined by communications protocols, said data packets including encoded data transportable over a communication network, said system comprising:
a traffic simulator for generating simulated network traffic to test network equipment, said traffic simulator including:
a processor that generates a portion of one of said data packets based upon a user selected communications protocol, said protocol comprising a list of header fields, each header field corresponding to a portion of said data packet;
a display that displays said data packet in a first window pane, said first window pane comprising a plurality of header field presentations, each header field presentation comprising one of said header fields and further comprising said portion of that data packet corresponding to that header field, said portion of said data packet being displayed in a format that depends on said header field and the display displays in a second window pane the encoded data of said data packet for transmission as simulated traffic;
an input for receiving changes to said protocol, including changes to said header fields and said data packet, said changes resulting in new encoded data for transmission as simulated traffic, with said processor receiving said input and changing said display of said data packet to reflect said new encoded data in said second window pane; and
an output from which the new encoded data is transmitted over a communications network, wherein said protocol values of said protocol fields of a plurality of different protocol layers are editable within said first window pane while said protocol values of said protocol fields of said different protocol layers are displayed within said first window pane.

23. The system of claim 22 wherein the number of said header fields is independent of display size.

24. The system of claim 22 further comprising a menu of additional protocols, said menu available on said display.

25. The system of claim 22 wherein said protocol comprises a plurality of layers each layer comprising a header field, and wherein said protocol layers are visible in said first window pane by scrolling said first pane, if necessary.

26. The system of claim 22 wherein the entire encoded data packet is viewable in said second pane, by scrolling said second pane, if necessary.

27. The system of claim 22 wherein said protocol changes include modifications to selected portions of a protocol.

28. The system of claim 22 wherein said processor is operable for changing said display of said data packet in a first window pane to reflect said changes to said protocol.

* * * * *